United States Patent
Arold

(10) Patent No.: US 6,179,707 B1
(45) Date of Patent: Jan. 30, 2001

(54) VENTILATION NOZZLE FOR VEHICLES

(75) Inventor: Klaus Arold, Sindelfingen (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/306,293

(22) Filed: May 6, 1999

(30) Foreign Application Priority Data

May 7, 1998 (DE) .............................................. 198 20 333

(51) Int. Cl.[7] .................................................. B60H 1/34
(52) U.S. Cl. .......................... 454/152; 454/150; 454/155
(58) Field of Search ................................... 454/152, 155, 454/145, 150, 154

(56) References Cited

U.S. PATENT DOCUMENTS 4,938,033  7/1990 Ogihara et al. .

FOREIGN PATENT DOCUMENTS

| 35 09 537 A1 | 9/1986 | (DE) . |
| 0 368 017 | 5/1990 | (DE) . |
| WO 94/00310 | 1/1994 | (DE) . |
| 43 00 910 A1 | 3/1994 | (DE) . |
| 43 27 266 | 8/1994 | (DE) . |
| 43 27 266 C1 | 8/1994 | (DE) . |
| 195 09 507 | 9/1995 | (DE) . |
| 195 29 451 | 11/1996 | (DE) . |
| 195 29 451 C1 | 11/1996 | (DE) . |
| 0 424 879 A2 | 5/1991 | (EP) . |
| 0 596 446 A1 | 5/1994 | (EP) . |

Primary Examiner—Denise L. Ferensic
Assistant Examiner—Jiping Lu
(74) Attorney, Agent, or Firm—Evenson, McKeown, Edwards & Lenahan, P.L.L.C.

(57) ABSTRACT

A ventilation nozzle for vehicles has a main duct and a secondary duct branching off therefrom. The ducts lead into two mutually separated blow-out openings and have controllable air adjusting devices. These adjusting devices are arranged in the area of the secondary duct branch off. Each adjusting device is assigned to one of the ducts, respectively, for adjusting the air quantities flowing to the blow-out openings. To provide an individually adjustable indirect air flow by way of the blow-out opening of the secondary duct, the adjusting device assigned to the secondary duct is constructed as an air flap which provides an air siphoning function from the main duct. A separate control element is assigned to each adjusting device for its adjustment.

20 Claims, 1 Drawing Sheet

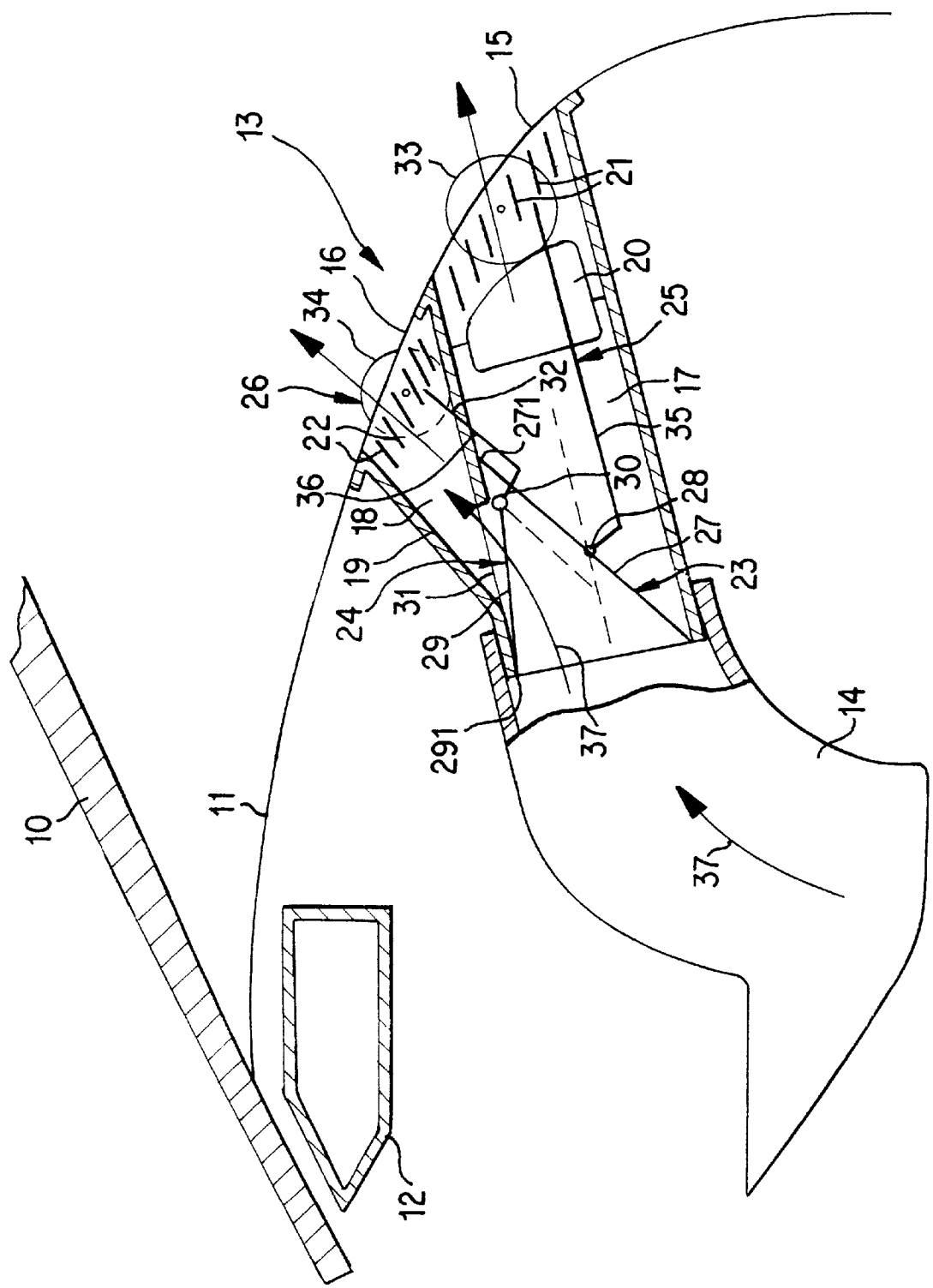

VENTILATION NOZZLE FOR VEHICLES

This application claims the priority of German patent application No. 198 20 333.0, filed May 7, 1998, the disclosure of which is expressly incorporated by reference herein.

BACKGROUND AND SUMMARY OF THE INVENTION

This invention relates to a ventilation nozzle for vehicles having a main duct and a secondary duct which branches off from the main duct. The main and secondary ducts are constructed in a nozzle housing and lead out in two mutually separated blow-out openings. The ventilation nozzle has controllable adjusting devices which are assigned to respective ducts and which are arranged in the area of the secondary duct branch-off. These adjusting devices are used for adjusting the air quantities flowing to the blow-out openings.

In a known ventilation nozzle of this type (German Patent Document DE 195 29 451 C1), two adjusting devices for a main duct and a secondary duct are provided. These adjusting devices are constructed as two-bladed air flaps which are disposed in the center and which are adjusted by a common control element. In order to provide the secondary flap with a desired opening characteristic, this secondary flap is coupled with a connecting link in a swivellably arranged control segment, and the control segment is connected with the main flap by an adjusting rod with a control element to be operated manually. The connecting link in the control segment is constructed such that, when the adjusting element is operated out of the first end position of the air flaps causing the respectively assigned duct to be closed, the auxiliary flap keeps the secondary duct completely covered until the main flap has approximately reached its center position, completely opening up the main duct.

In another known ventilation nozzle of this type (German Patent Document DE 43 27 266 C1), the adjusting devices for two ducts are constructed as two-bladed air flaps which are disposed in the center and which, on the one hand, can be operated by a manual operating element and, on the other hand, can be remotely operated from the driver's position in order to adjust a defroster function. Between the two air flaps, coupling devices are provided by which the secondary flap can be closed when the main flap undergoes opening movement and the main flap can be closed when the secondary flap undergoes opening movement. As a result of positioning the ventilating nozzles in the dashboard, the blow-out opening of the secondary duct is intended for dehumidifying and defrosting the side windows, and the blow-out opening of the main duct is intended for a direct blowing at the front passengers. The blow-out direction can also be adjusted laterally and upwards and downwards by swivelling lamellae which extend vertically and horizontally.

It is an object of the invention to improve a ventilation nozzle of the initially mentioned type such that, by way of the secondary duct, indirect ventilation of the vehicle occupant compartment is sufficiently effective and can be adjusted independently of direct ventilation of the vehicle occupants carried out by the main duct.

According to the invention, this object is achieved by constructing the adjusting device assigned to the secondary duct as an air flap with an air siphoning function from the main duct and providing a separate control element for each adjusting device.

The ventilation nozzle according to the invention has the advantage that, as a result of constructing the adjusting device for the secondary duct as an air siphoning flap, even when the main duct is partially open, an air flow which is branched off for the secondary duct is sufficiently large to permit intensive indirect ventilation of the vehicle occupant compartment. The operating possibility of the air siphoning flap, which is independent of the adjusting device for the main duct, permits sensitive metering of the air quantity flowing out of the secondary duct.

Advantageous embodiments of the ventilation nozzle according to the invention with expedient developments, and further developments of the invention, are defined by the claims.

BRIEF DESCRIPTION OF THE DRAWING

By way of an embodiment illustrated in the single drawing FIGURE, the invention will be described in detail. The drawing is a schematic longitudinal sectional view of a ventilation nozzle arranged in the dashboard of a vehicle occupant compartment.

DESCRIPTION OF THE PREFERRED EMBODIMENT

The drawing is a schematic cutout of a windshield 10 and of a dashboard 11 of an occupant compartment of a vehicle. Reference number 12 indicates a hollow-section support which extends transversely to the occupant compartment and on which the windshield 10 and the dashboard 11 are fixed. A ventilation nozzle 13 is inserted in the dashboard 11 and is connected to a ventilation shaft 14 which extends inside the dashboard 11. The ventilation shaft can be supplied with fresh air and air whose temperature is adjusted. The ventilation nozzle 13, which is inserted flush into the dashboard 11, has a nozzle housing 19 with two mutually separated blow-out openings 15 and 16 which are situated in the contour plane of the dashboard 11. A main air duct 17, which is constructed in the housing 19, leads into the blow-out opening 15, which is provided for direct ventilation of the occupant compartment. A secondary duct 18, which branches off the main duct 17, leads into the blow-out opening 16, which is provided for indirect ventilation of the occupant compartment. For adjusting the blow-out direction, a set of vertically aligned swivelling lamellae 20 and a set of horizontally aligned swivelling lamellae 21 are arranged in the main duct 17 behind one another viewed in the air flow direction. By swivelling the vertical swivelling lamellae 20, the blow-out direction can be changed laterally, and by swivelling the horizontal swivelling lamellae, the blow-out direction can be changed upwards and downwards.

A plurality of parallel, horizontally aligned swivelling lamellae 22 are arranged in the secondary duct 18 directly in the blow-out opening 16. The blow-out direction of the blow-out opening 16 can be deflected upwards and downwards by swivelling the lamellae 22.

In the area of the secondary duct 18 branching off from the main duct 17, two air adjusting devices 23, 24 are arranged in the main duct 17 which can be adjusted by separate control elements 25, 26 in order to define the air quantities flowing through the main duct 17 and the second duct 18. The adjusting device 23 assigned to the main duct 17 is constructed as a two-bladed air flap 27 which can be swivelled about a swivel pin 28 aligned transversely to the main axis of the main duct 17 and fixed in the housing 19. In this case, the air flap 27 is conceived and directed with its swivel pin 28 such that it is situated below the secondary duct branch-off 31 and, in its closed position blocking the main duct 17, rests with its upper flap edge 271 on the duct wall 32 of the main duct 17 which carries the secondary duct branch-off, specifically downstream of the secondary duct branch off 31.

The adjusting device 24 for the secondary duct 18 is constructed as a single-bladed air flap 29 which can be swivelled about a swivel pin 30 parallel to the swivel pin 28. The air flap 29 is conceived such that it can perform an air siphoning function and siphon off air from the main duct 17. For this purpose, the swivel pin 30 is arranged on one flap edge of the air flap 29 extending parallel thereto and is fixed on the duct wall 32 of the main duct 17 having the secondary duct branch-off 31 downstream of the secondary duct branch off 31. Preferably, the swivel pin is fixed directly on the boundary edge of the secondary duct branch off 31 which is in the rear as viewed in the air flow direction. In this case, the air flap 29 is arranged such that, during its opening movement, its forward flap edge 291 facing away from the swivel pin 30 swivels into the main duct 17 and, in its maximal open position, encloses an acute angle with respect to the plane of the secondary duct branch off 31.

The control elements 25, 26 for the air flaps 27 and 29 have the same construction. Each control element has a knurled wheel 33 or 34 which is to be operated manually, projects slightly beyond the contour of the dashboard 11 and can be gripped by one finger. The rotating movement of the knurled wheels 33 and 34 is converted by way of articulated levers 35 and 36 into a swivelling movement of the assigned air flaps 27 and 29. In the drawing, the two air flaps 27 and 29 are shown in their closed positions by solid lines and are shown in their maximal open positions by broken lines. Each air flap 27 or 29 can be swivelled by one of the knurled wheels 33 or 34 in this area independently of the other air flap 29 or 27. The air flow in the ventilation shaft 14 and through the main duct 17 and the secondary duct 18 in the housing 19 of the ventilation nozzle 13 is indicated by arrows 37.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:
1. Ventilation nozzle for vehicles comprising:
   a ventilation shaft,
   a main duct which leads from said ventilation shaft to a first blow-out opening and a secondary duct which branches off from the main duct and leads to a second blow-out opening, said main duct and said secondary duct being constructed in a nozzle housing and separated by a duct wall, and
   controllable adjusting devices which are assigned to one of the ducts, respectively, and arranged in the area at which the secondary duct branches off, said adjusting devices adjusting air quantities flowing to the blow-out openings,
   wherein one of the adjusting devices which is assigned to the main duct is constructed as a first air flap which can be swivelled about a first swivel axis located within the main duct,
   wherein another of the adjusting devices which is assigned to the secondary duct is constructed as a second air flap which can be swivelled about a second swivel axis substantially parallel to said first swivel axis, said second air flap having an air siphoning function by which air is siphoned from the main duct, said second swivel axis being fixed on said duct wall,
   wherein a separate control element is provided for each adjusting device so that each air flap can be swivelled independently of the other air flap, and
   wherein, in its closed position blocking the main duct, one flap edge of the first air flap rests against said duct wall.

2. Nozzle according to claim 1, wherein the second air flap has a single-bladed construction and is swivellable about a swivel pin, extending on or close to its one flap edge in parallel thereto and fixed on the duct wall having a secondary duct branch-off, so that, for opening the secondary duct branch-off, its flap edge facing away from the swivel pin swivels into the main duct.

3. Nozzle according to claim 2, wherein the first air flap is a two-bladed air flap which is held in the main duct swivellably about a swivel pin aligned transversely to the axis of the main duct.

4. Nozzle according to claim 3, wherein the swivel pin of the two-bladed air flap is fixed below the secondary branch-off such that, in its closed position blocking the main duct, said one flap edge rests downstream of the secondary duct branch-off.

5. Nozzle according to claim 2, wherein the blow-out openings are arranged in the nozzle housing with mutually deviating blow-out directions.

6. Nozzle according to claim 5, wherein the blow-out openings are positioned in a dashboard of an occupant compartment of a vehicle so that the first blow-out opening has a direct blow-out direction aimed at front occupants and the second blow-out opening has an indirect blow-out direction aimed at a head area of the occupant compartment.

7. Nozzle according to claim 1, wherein the first air flap is a two-bladed air flap which is held in the main duct swivellably about a swivel pin aligned transversely to the axis of the main duct.

8. Nozzle according to claim 7, wherein the swivel pin of the two-bladed air flap is fixed below a secondary branch-off such that, in its closed position blocking the main duct, said one flap edge rests downstream of the secondary duct branch-off.

9. Nozzle according to claim 8, wherein the blow-out openings are arranged in the nozzle housing with mutually deviating blow-out directions.

10. Nozzle according to claim 9, wherein the blow-out openings are positioned in a dashboard of an occupant compartment of a vehicle so that the first blow-out opening has a direct blow-out direction aimed at front occupants and the second blow-out opening has an indirect blow-out direction aimed at a head area of the occupant compartment.

11. Nozzle according to claim 7, wherein the blow-out openings are arranged in the nozzle housing with mutually deviating blow-out directions.

12. Nozzle according to claim 11, wherein the blow-out openings are positioned in a dashboard of an occupant compartment of a vehicle so that the first blow-out opening has a direct blow-out direction aimed at front occupants and the second blow-out opening has an indirect blow-out direction aimed at a head area of the occupant compartment.

13. Nozzle according to claim 1, wherein the blow-out openings are arranged in the nozzle housing with mutually deviating blow-out directions.

14. Nozzle according to claim 13, wherein the blow-out openings are positioned in a dashboard of an occupant compartment of a vehicle so that the first blow-out opening has a direct blow-out direction aimed at front occupants and the second blow-out opening has an indirect blow-out direction aimed at a head area of the occupant compartment.

15. Ventilation nozzle for a vehicle comprising:

a ventilation shaft, a main air duct leading from said ventilation shaft to a first blow-out opening which opens to a vehicle compartment, a secondary air duct, branching off from the main air duct, separated from the main air duct by a duct wall, and leading to a second blow-out opening which opens to the vehicle compartment, controllable adjusting devices for the main and secondary air ducts, one of the adjusting devices which adjusts air flow through said main air duct being a first air flap which can be swivelled about a first swivel axis located within the main duct, another of the adjusting devices for the secondary air duct being a second air flap which siphons air from the main air duct and which can be swivelled about a second swivel axis substantially parallel to said first swivel axis, said second swivel axis fixed on said duct wall, and a separate control element for each of said adjusting devices so that each air flap can be swivelled independently of the other air flap, wherein, in its closed position blocking the main duct, one flap edge of the first air flap rests against said duct wall.

16. Ventilation nozzle according to claim 15, wherein said second swivel axis is defined by a swivel pin on one edge of said second air flap about which said second air flap swivels, said swivel pin being fixed to said duct wall.

17. Ventilation nozzle according to claim 16, wherein said second air flap has a single-bladed construction.

18. Ventilation nozzle according to claim 15, wherein the first air flap is a two-bladed air flap.

19. Ventilation nozzle according to claim 18, wherein said first swivel axis is defined by a swivel pin aligned with an axis of said main air duct.

20. Ventilation nozzle according to claim 15, wherein each of said control elements includes a manually operable wheel and an articulated lever interconnecting the wheel with one of said controllable adjusting devices.

* * * * *